(12) United States Patent
Yoshikawa (10) Patent No.: US 11,233,856 B2
(45) Date of Patent: Jan. 25, 2022

(54) SELECTING AN ADDRESS OF A DEVICE

(71) Applicant: HEWLETT PACKARD ENTERPRISE DEVELOPMENT LP, Houston, TX (US)

(72) Inventor: Shinji Yoshikawa, Tokyo (JP)

(73) Assignee: Hewlett Packard Enterprise Development LP, Houston, TX (US)

( * ) Notice: Subject to any disclaimer, the term of this patent is extended or adjusted under 35 U.S.C. 154(b) by 911 days.

(21) Appl. No.: 15/843,564

(22) Filed: Dec. 15, 2017

(65) Prior Publication Data
US 2019/0190993 A1 Jun. 20, 2019

(51) Int. Cl.
| | |
|---|---|
| *G06F 15/16* | (2006.01) |
| *H04L 29/08* | (2006.01) |
| *H04L 29/12* | (2006.01) |
| *H04L 12/66* | (2006.01) |
| *H04L 12/801* | (2013.01) |
| *H04W 8/04* | (2009.01) |
| *H04W 76/12* | (2018.01) |
| *H04W 88/16* | (2009.01) |
| *H04W 92/16* | (2009.01) |

(52) U.S. Cl.
CPC .............. *H04L 67/14* (2013.01); *H04L 12/66* (2013.01); *H04L 47/14* (2013.01); *H04L 61/1511* (2013.01); *H04L 61/2007* (2013.01); *H04W 8/04* (2013.01); *H04W 76/12* (2018.02); *H04W 88/16* (2013.01); *H04W 92/16* (2013.01)

(58) Field of Classification Search
CPC ..... H04L 12/4633; H04L 12/66; H04L 47/14; H04W 76/12; H04W 88/16
See application file for complete search history.

(56) References Cited

U.S. PATENT DOCUMENTS

| | | |
|---|---|---|
| 2,542,012 A | 2/1951 | De et al. |
| 6,233,458 B1 | 5/2001 | Haumont et al. |
| 7,724,688 B2 | 5/2010 | Yamada et al. |
| 8,787,154 B1 | 7/2014 | Medved et al. |
| 8,861,547 B2 | 10/2014 | Gao et al. |
| 9,083,587 B2 | 7/2015 | Babu et al. |
| 9,450,817 B1 | 9/2016 | Bahadur et al. |
| 9,577,845 B2 | 2/2017 | Thakkar et al. |

(Continued)

FOREIGN PATENT DOCUMENTS

| | | |
|---|---|---|
| EP | 2542012 A1 | 1/2013 |
| EP | 3407645 A1 | 11/2018 |
| WO | WO-2017126884 A1 | 7/2017 |

OTHER PUBLICATIONS

Bart Barton, "LTE and Beyond: PGW and SGW Selection Procedures in LTE," Mar. 14, 2013, pp. 1-2 [online], Retrieved from the Internet on Oct. 9, 2017 at URL: <http://www.iteandbeyond.com/2013/03/pgw-and-sgw-selection-procedures-in-lte.html>.

(Continued)

*Primary Examiner* — Oleg Survillo
(74) *Attorney, Agent, or Firm* — Hewlett Packard Enterprise Patent Department LP (57) ABSTRACT

Examples provided herein selects a device such as a gateway. One or more IP packets carrying a session establishing request are received and an address of one of a plurality of gateways is selected based on information on a wireless terminal included in the session establishing request, the selected address is set as a destination address of the IP packets.

20 Claims, 10 Drawing Sheets

(56) References Cited

U.S. PATENT DOCUMENTS

| | | | |
|---|---|---|---|
| 9,648,542 B2 | 5/2017 | Hsu et al. | |
| 9,763,078 B1 | 9/2017 | Zheng et al. | |
| 2005/0249194 A1 | 11/2005 | Anurag et al. | |
| 2006/0046728 A1 | 3/2006 | Jung et al. | |
| 2006/0140149 A1 | 6/2006 | Kim et al. | |
| 2007/0104205 A1 | 5/2007 | Baik | |
| 2007/0213060 A1 | 9/2007 | Shaheen | |
| 2007/0243821 A1 | 10/2007 | Hundscheidt et al. | |
| 2007/0248064 A1 | 10/2007 | Shaheen | |
| 2009/0047947 A1 | 2/2009 | Giaretta et al. | |
| 2011/0075675 A1 | 3/2011 | Koodli et al. | |
| 2011/0090852 A1 | 4/2011 | Ramie et al. | |
| 2011/0090911 A1 | 4/2011 | Hao et al. | |
| 2011/0310868 A1 | 12/2011 | Yang et al. | |
| 2012/0063300 A1 | 3/2012 | Sahin et al. | |
| 2012/0173661 A1 | 7/2012 | Mahaffey et al. | |
| 2012/0269167 A1 | 10/2012 | Velev et al. | |
| 2012/0275430 A1 | 11/2012 | Wang et al. | |
| 2013/0121298 A1 | 5/2013 | Rune et al. | |
| 2013/0138823 A1 | 5/2013 | Centemeri et al. | |
| 2013/0195012 A1 | 8/2013 | Laitila et al. | |
| 2013/0272131 A1* | 10/2013 | Takano | H04W 28/0247 370/235 |
| 2013/0272247 A1 | 10/2013 | Guo | |
| 2013/0279345 A1* | 10/2013 | Tamura | H04L 12/5691 370/241 |
| 2014/0016614 A1 | 1/2014 | Velev et al. | |
| 2014/0056290 A1 | 2/2014 | Pazhyannur et al. | |
| 2014/0078986 A1 | 3/2014 | Kaippallimalil et al. | |
| 2014/0194111 A1 | 7/2014 | Aso et al. | |
| 2014/0328246 A1 | 11/2014 | Xu et al. | |
| 2015/0049610 A1 | 2/2015 | Kim et al. | |
| 2015/0117454 A1 | 4/2015 | Koponen et al. | |
| 2015/0146513 A1 | 5/2015 | Zakrzewski | |
| 2015/0188770 A1 | 7/2015 | Naiksatam et al. | |
| 2015/0208281 A1 | 7/2015 | Kim et al. | |
| 2015/0223190 A1 | 8/2015 | Backman | |
| 2015/0245249 A1 | 8/2015 | Grootwassink et al. | |
| 2015/0256349 A1 | 9/2015 | Kim et al. | |
| 2016/0173334 A1 | 6/2016 | Gavrilovic et al. | |
| 2016/0234681 A1 | 8/2016 | Swissa et al. | |
| 2016/0277211 A1 | 9/2016 | Kumar et al. | |
| 2017/0126618 A1 | 5/2017 | Bhaskaran et al. | |
| 2017/0142613 A1 | 5/2017 | Singh et al. | |
| 2017/0149667 A1 | 5/2017 | Dahod et al. | |
| 2017/0171068 A1 | 6/2017 | Morper et al. | |
| 2017/0199751 A1 | 7/2017 | Sama et al. | |
| 2017/0245316 A1 | 8/2017 | Salkintzis | |
| 2017/0325055 A1 | 11/2017 | Enomoto et al. | |
| 2018/0103502 A1 | 4/2018 | Kawasaki et al. | |
| 2018/0132099 A1 | 5/2018 | Li | |
| 2018/0338265 A1 | 11/2018 | Goel et al. | |
| 2019/0007984 A1 | 1/2019 | Kuroda et al. | |
| 2019/0045422 A1* | 2/2019 | Shimojou | H04W 24/02 |
| 2019/0110324 A1 | 4/2019 | Xu et al. | |
| 2019/0116118 A1 | 4/2019 | Kapela | |
| 2019/0116624 A1 | 4/2019 | Tandon et al. | |
| 2019/0124046 A1 | 4/2019 | Mehra | |
| 2019/0190826 A1* | 6/2019 | Yoshikawa | H04L 45/66 |
| 2019/0191471 A1* | 6/2019 | Yoshikawa | H04W 76/12 |

OTHER PUBLICATIONS

Cisco Technology, Inc., "Configuring GPRS Tunneling Protocol Support," Jul. 31, 2011, pp. 1-12.

Cisco, "CLI Book 2: Cisco ASA Series Firewall CLI Configuration Guide, 9.7," Sep. 11, 2017, pp. 1-44 [online], Retrieved from the Internet on Oct. 9, 2017 at URL: <https://www.cisco.com/c/en/us/td/docs/security/asa/asa97/configuration/firewall/asa-97-firewall-config/inspect-mobile.htm>.

Erik Brands, "Flow-Based Monitoring of GTP Traffic in Cellular Networks," Master of Science Thesis, Jul. 20, 2012, pp. 1-64, University of Twente, Enschede, The Netherlands.

Sunny Kumar Lohani, "Performance of SDN-based LTE EPC Gateways," Oct. 2015, pp. 1-28, Department of Computer Science and Engineering, Indian Institute of Technology, Bombay, Mumbai, India.

Extended European Search Report Received for EP Patent Application No. 18212238.2, dated Mar. 6, 2019, 12 pages.

* cited by examiner

SELECTING AN ADDRESS OF A DEVICE

BACKGROUND

As wireless communication standards, the 3rd Generation (3G) and 4th Generation (4G) standards have been implemented, and the standardization of the 5th Generation (5G) is now under progress.

A Long Term Evolution (LTE) network is based on the 4G standard, and includes an Evolved Universal Terrestrial Radio Network (eUTRAN), which is a wireless network, and an Evolved Packet Core (EPC), which is a core network. The wireless network (eUTRAN) is provided with one or more base stations called eNodeB, and the EPC is provided with a Mobility Management Entity (MME), a Serving Gateway (SGW) and a Packet data network Gateway (PGW). The EPC may include one or more MMEs, SGWs and PGWs.

The MME is a mechanism for handling a Control Plane (C-Plane) of network management. It is a network management device and is connected to the eNodeB through an interface called S1-MME. The MME is connected to a Home Subscriber Server (HSS) through an interface called S6a. The SGW is a gateway located in the EPC, and handles C-Plane signals, i.e., control signals, and User Plane (U-Plane) signals, i.e., user data. The SGW is connected to the eNodeB through an interface called S1-U, and to the MME through an interface called S11. The PGW is a gateway for connecting a wireless terminal, such as a mobile terminal, to a packet data network (PDN), which is an external network such as the Internet. The PGW is connected to the SGW through interfaces called S5/S8-C and S5/S8-U, which handle the C-Plane and the U-Plane, respectively. The wireless terminal may be any mobile equipment, such as a mobile telephone, smartphone or tablet, or a terminal mounted on an automobile or drone.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "multiple" or "plurality," as used herein, is defined as two or more. The term "another," as used herein, is defined as at least a second or more. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on. The term "transmitted," as used herein, is defined as causing to pass on from one place to another. As such this includes directly (e.g., without an intervening element) or indirectly (with an intervening element). As used herein, the term "device" means a machine, apparatus, manufacture, and/or combination thereof.

Figure 1:
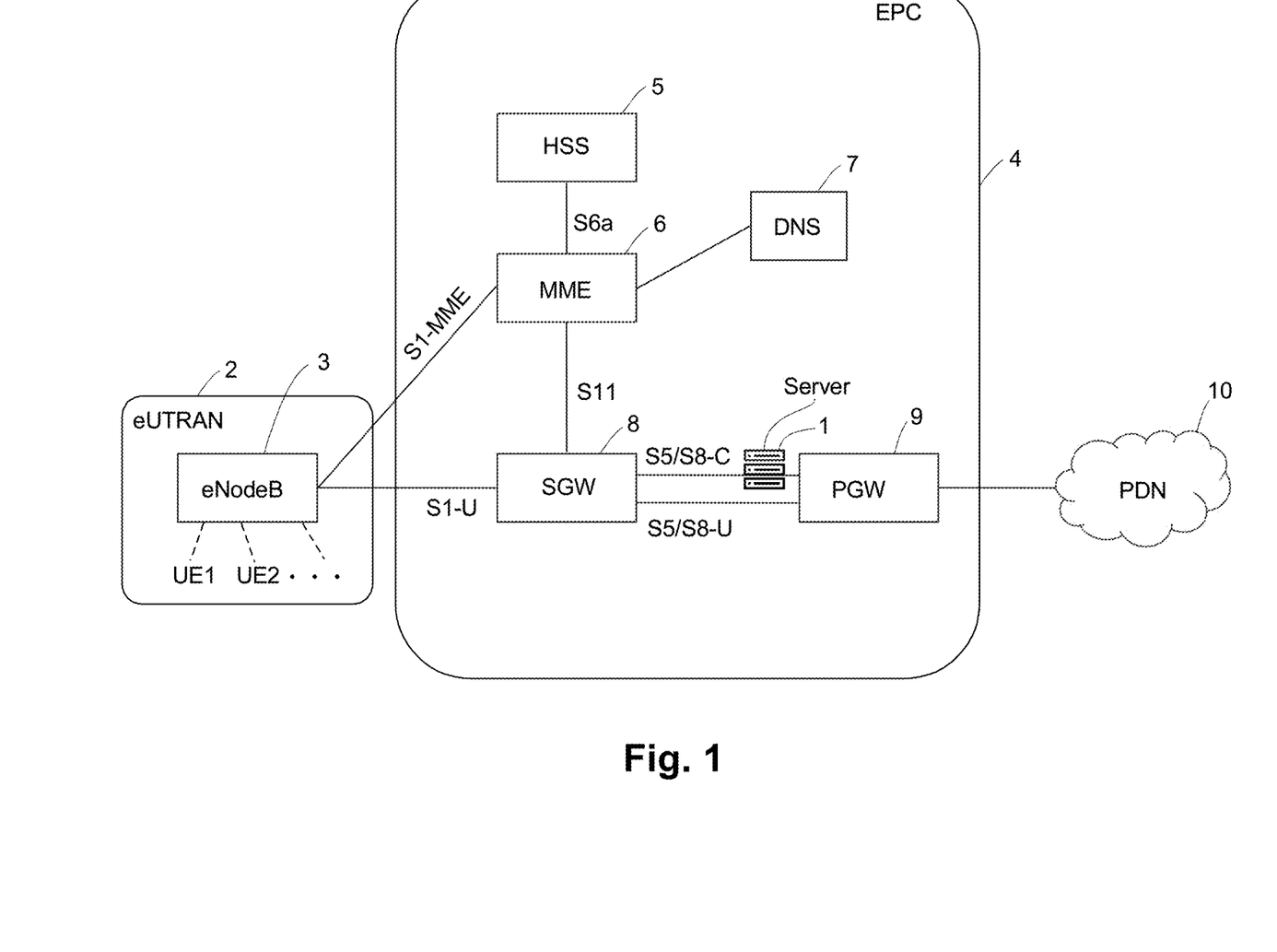
FIG. 1 is an example schematic block diagram showing a network configuration of an LTE network including a server installed with a gateway selecting module according to one embodiment of the present disclosure.

In an LTE network configuration shown in FIG. 1, one or more wireless terminals, such as User Equipment (UE) UE1, UE2, etc. may be located within a cell supported by a base station (e.g., eNodeB) 3 in an eUTRAN network 2. To connect the UE1 to a PDN 10 through a core network EPC 4, the wireless terminal UE1 may perform an attachment procedure to the EPC 4 through the eNodeB 3. The attachment procedure may start with the transmission of an attachment request (Attach Request) from the UE1 to the eNodeB 3. The Attach Request may be delivered to an MME 6 from the eNodeB 3 through an S1-MME interface, and the MME 6 may communicate with an HSS 5 through an S6a interface for performing such actions as registering the location of the UE1 and authenticating the UE1.

The MME 6 may query a Domain Name System (DNS) 7 using an Access Point Name (APN) associated with the UE1 as a key, for acquiring the domain name of a PGW 9, and may again query the DNS 7 using the domain name for acquiring a corresponding Internet Protocol (IP) address of the PGW 9. The MME 6 may also query the DNS 7 using the location information (Tracking Area (TA)) of the UE1 as a key, for acquiring a domain name of an SGW 8, and may again query the DNS with that domain name to acquire a corresponding IP address of the SGW 8.

The MME 6 may generate a session establishing request, which is a request for establishing a network session. In the example LTE network, the session establishing request is a GTP message such as a Create Session Request for requesting the SGW 8 and the PGW 9 to establish a GTP session in the U-Plane. In the present example, the IP address of the SGW 8 may be set in the destination IP address of one or more IP packets carrying the Create Session Request, and the IP address of the PGW 9 may be set in the Fully Qualified Tunnel End Point Identifier (F-TEID) of the Create Session Request. The Create Session Request may be transmitted to the SGW 8 according to the destination IP address of the IP packets, and transmitted from the SGW 8 to the PGW 9.

The PGW 9 may return to the SGW 8 a response, which may be a GTP message called Create Session Response, in which the address of the PGW 9 is set in the F-TEID field. The SGW 8 may set the F-TEID field of the Create Session Response to also include the IP address of the SGW 8, and transfer the Create Session Response to the MME 6. The MME 6 may notify the eNodeB 3 of the acceptance of the Attach Request, and a GTP tunnel in the U-Plane connecting the eNodeB 3 and the PDN 10 is established through the SGW 8 and the PGW 9. The UE1 can communicate with the PDN 10 through the established GTP tunnel.

In the example described above, the IP address of the destination PGW 9 is acquired in response to the MME 6 querying the DNS 7 using the APN associated with the UE1 as a key to acquire a domain name, and once again querying the DNS 7 with the acquired domain name. Accordingly, the IP address of the PGW 9 is determined in correspondence to the APN associated with the UE1.

As such, wireless terminals having the same APN setting may be connected to the same PGW even if the terminals belong to different users. Such APN-based determination of destination PGW could make it difficult for a communication service operator, including a Mobile Virtual Network Operator (MVNO) that provides services by borrowing a network infrastructure from a communication carrier such as NTT Docomo, to provide versatile services.

In one embodiment, the LTE network shown in FIG. 1 may include a server 1 installed with a gateway control device embodied as a gateway selecting module for receiving C-Plane signals from the SGW 8. In this embodiment, the server 1 is selected instead of the PGW 9, and the PGW 9 is selected by the server 1. The location of the server 1 in FIG. 1 only represents a conceptual location.

Figure 2:
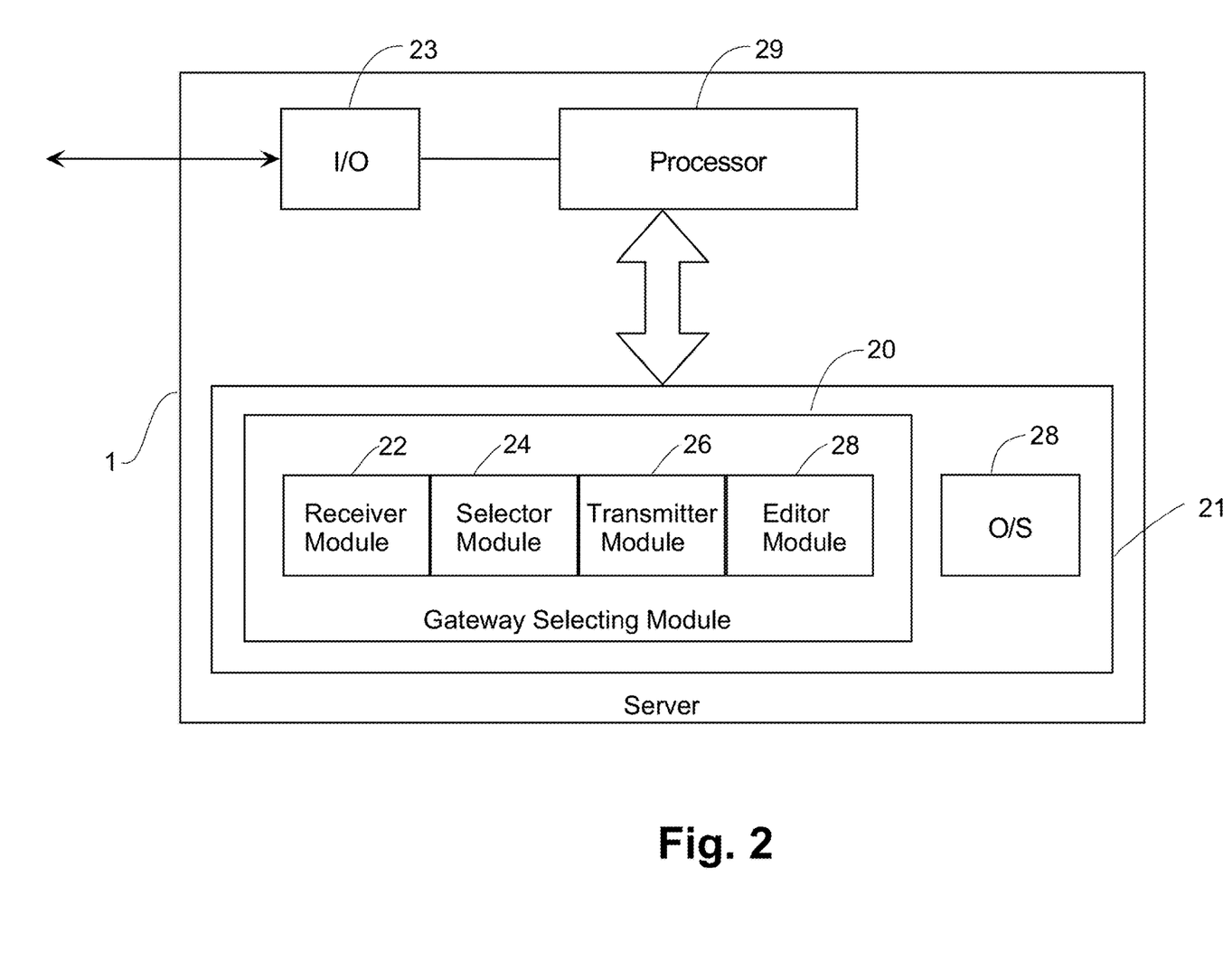
FIG. 2 is an example functional block diagram of the gateway selecting module installed in the server of FIG. 1.

FIG. 2 shows an example functional block diagram of a gateway control device which may be hardware, instructions executable by a processor, and/or combination thereof to provide such functionality. For example, the gateway control device may include an integrated circuit, semiconductor, memory module, central processing unit (CPU), processing resource, application-specific integrated circuit (ASIC), processor, chipset, virtualized component or other type of management component capable of managing the GTP message. In one example, the gateway control device includes a gateway selecting module 20 installed in a storage 21 on the server 1 of FIG. 1. The server 1 may communicate with the C-Plane via an I/O module 23, and may include a processor 29 directed by an operating system 28 and executes instructions stored in the gateway selecting module 20, including a receiver module 22 for providing instructions to receive GTP messages, a selector module 24 for providing instructions to select gateways, and a transmitter module 26 for providing instructions to transmit GTP messages. Each module may include, by way of example, instructions (e.g., stored on a machine-readable medium) that, when executed (e.g., by controller and/or processor), implements the functionality of the module. Alternatively, or in addition, each module may include electronic circuitry (i.e., hardware) that implements the corresponding functionality.

In one embodiment, the storage 21 may be any machine-readable storage, such as a Random Access Memory (RAM), an Electrically-Erasable Programmable Read-Only Memory (EEPROM) or the like that stores executable instructions for implementing the functions of the gateway selecting module 20.

In one embodiment, the gateway selecting module 20 may also be provided with an editor module 28 for editing GTP messages. For example, the editor module 28 may rewrite a received Create Session Request to have the IP address of the server 1 as the source address. The receiver module 22, the selector module 24, the transmitter module 26 and the editor module 28 may each be hardware, instructions executable by a processor, and/or combination thereof to provide such functionality.

The server 1 may receive a Create Session Response from a PGW, such as the PGW 9, and may rewrite the IP address of the S5/S8-C interface with the SGW 8 in the F-TEID field of the received Create Session Response to the IP address of the server 1. As such, the server 1 can receive all GTP messages, including other GTP messages such as a Modify Bearer Request, and can edit them as desired. Other parts of GTP messages may also be edited, with reference to The 3rd Generation Partnership Project (3GPP).

The gateway selecting module 20 may be installed in the server 1 and the functions of the receiver module 22, the selector module 24, the transmitter module 26 and the editor module 28 may be performed in response to the processor 29 executing instructions stored in the modules. For example, the gateway selecting module 20 may be embodied as a gateway control device comprising a receiver, a selector and a transmitter to perform functions corresponding to instructions of the modules 22, 24 and 26 executed by the processor 29 in cooperation with the I/O module 23. The gateway control device may also perform the function of the editor module 28. The gateway control device or the server 1 may be assigned with a unique IP address.

In one embodiment, the DNS 7 shown in FIG. 1 may return a domain name of the server 1 in response to a query made with a predetermined specific APN, which may be an APN common to wireless terminals located within a cell supported by a particular base station, a particular APN designated by a user operator, etc. The DNS 7 may also return the IP address of the server 1 in response to a query made with the domain name of the server 1. For example, if the UE1 is associated with the specific APN, the IP address of the server 1 may be returned from the DNS 7 to the MME 6.

Figure 3:
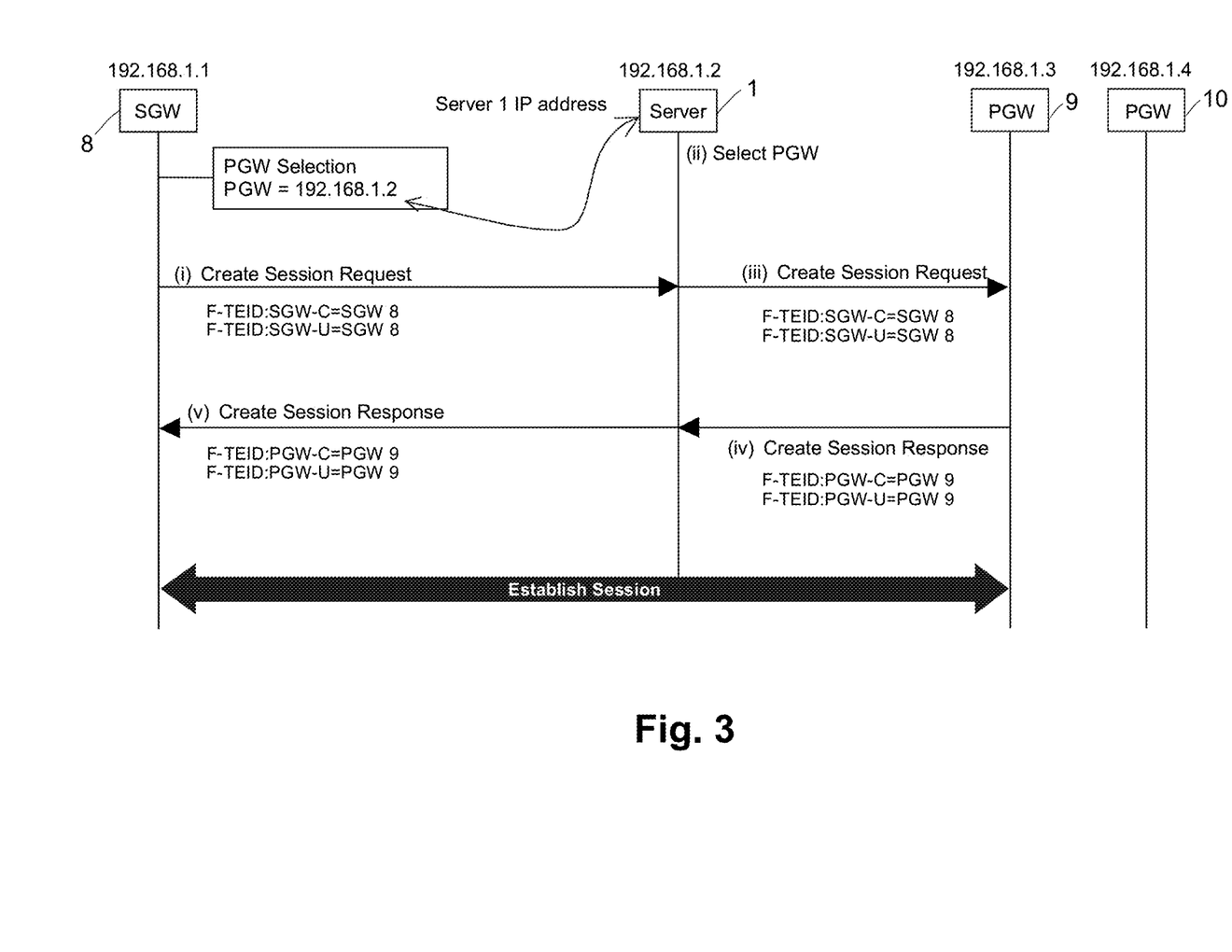
FIG. 3 shows an example sequence of messages between an SGW and a PGW from the transmission of a Create Session Request to the establishment of a communication session.

FIG. 3 shows an example sequence of messages transmitted for establishing a GTP session between the SGW 8 and the PGW 9 for this case. The UE1 may send an attachment request to the eNodeB 3, the MME 6 may communicate with the HSS 5 for authenticating the UE1, and the address of the SGW 8 (e.g., 192.168.1.1) selected by the MME 6 may be acquired from the DNS 7 in accordance with the location information (TA) of the UE1.

On the other hand, as the UE1 is associated with the specific APN, the DNS 7 returns the domain name and the IP address of the server 1 (e.g., 192.168.1.2) to the MME 6. As such, IP packets transmitted from the SGW 8 selected by the MME 6 may be set to have the IP address of the server 1 as the destination IP address.

Accordingly, IP packets carrying a Create Session Request are sent to the server 1, and the F-TEID field of the Request may be set to include the IP address of the SGW 8 as the destination information for transmitting C-Plane signals and U-Plane signals (see (i) in FIG. 3).

The receiver module 22 of the gateway selecting module 20 may receive the Create Session Request, and pass the Request to the selector module 24.

The selector module 24 may derive one or more information elements relating to the UE1, such as an International Mobile Subscriber Identity (IMSI) contained in the Create Session Request, and may select the IP address of the PGW 9 (e.g., 192.168.1.3) from among a plurality of PGWs including a PGW 10 having a different IP address (e.g., 192.168.1.4). The IP address of the PGW 9 may be selected as corresponding to the derived information element or in accordance with a predetermined logic based on the information element (see (ii) in FIG. 3).

The transmitter module 26 may generate one or more IP packets for carrying the received Create Session Request. The destination IP address of the IP packets may be set to the selected IP address, i.e., the IP address of the PGW 9, and the IP packets may be transmitted on the C-Plane to the PGW 9 (see (iii) in FIG. 3).

The PGW 9 may return a Create Session Response to the server 1. The F-TEID field in the Create Session Response may be set to include the IP address of the PGW 9 as the destination information for transmitting C-Plane signals and U-Plane signals (see (iv) in FIG. 3), and the Create Session Response may be returned to the SGW 8 (see (v) in FIG. 3).

As such, the server 1 may receive a GTP message representing a Create Session Request and select the PGW 9 for transmitting the Create Session Request, without altering the Create Session Request received from the SGW 8. U-Plane signals can thus be transmitted directly between the SGW 8 and the PGW 9, without going through the server 1.

An example method for selecting a PGW with the selector module 24 is now described. The information on the wireless terminal UE1 contained in the Create Session Request may include terminal information elements such as an IMSI, a Mobile Subscriber ISDN Number (MSISDN), an International Mobile Equipment Identity (IMEI) and APN.

For each specific one of the terminal information elements (e.g., for each IMSI) or for each specific combination of terminal information elements (e.g., for each combination of IMSI and IMEI), the selector module 24 may select a corresponding PGW in accordance with a predetermined relationship or a predetermined logic. The selector module 24 may also select a corresponding PGW in accordance with a predetermined relationship determined for each of categories, such as age, gender, address, subscribed services and billing information. These categories may be prepared from information on subscribers of wireless terminals, and may be obtained from a communication carrier such as NTT Docomo.

In an example, for each of categories prepared from combinations of age group, gender, and service types provided by the subscribing carrier, the selector module 24 may select a corresponding PGW in accordance with a predetermined relationship or a predetermined logic. The relationship or logic may be any relationship or logic determined as desired by a user operator of the server 1.

The aforementioned relationship may be provided in the form of a database such as a table (not shown) stored in an internal and/or external storage device of the server 1, and may be referred to by the selector module 24. For example, the address information of each PGW may be associated with each of specific terminal information elements (such as IMSI) or each of the predetermined categories.

Alternatively, a relationship between predetermined terminal information elements and the predetermined categories may be stored in a first database or table, and a second database or table may store a relationship between the categories and the PGWs. The selector module 24 may use a specific terminal information element in the Create Session Request to access the first database for acquiring a category associated with the terminal information element, and may access the second database to acquire the address information of a PGW associated with the acquired category.

Figure 4:
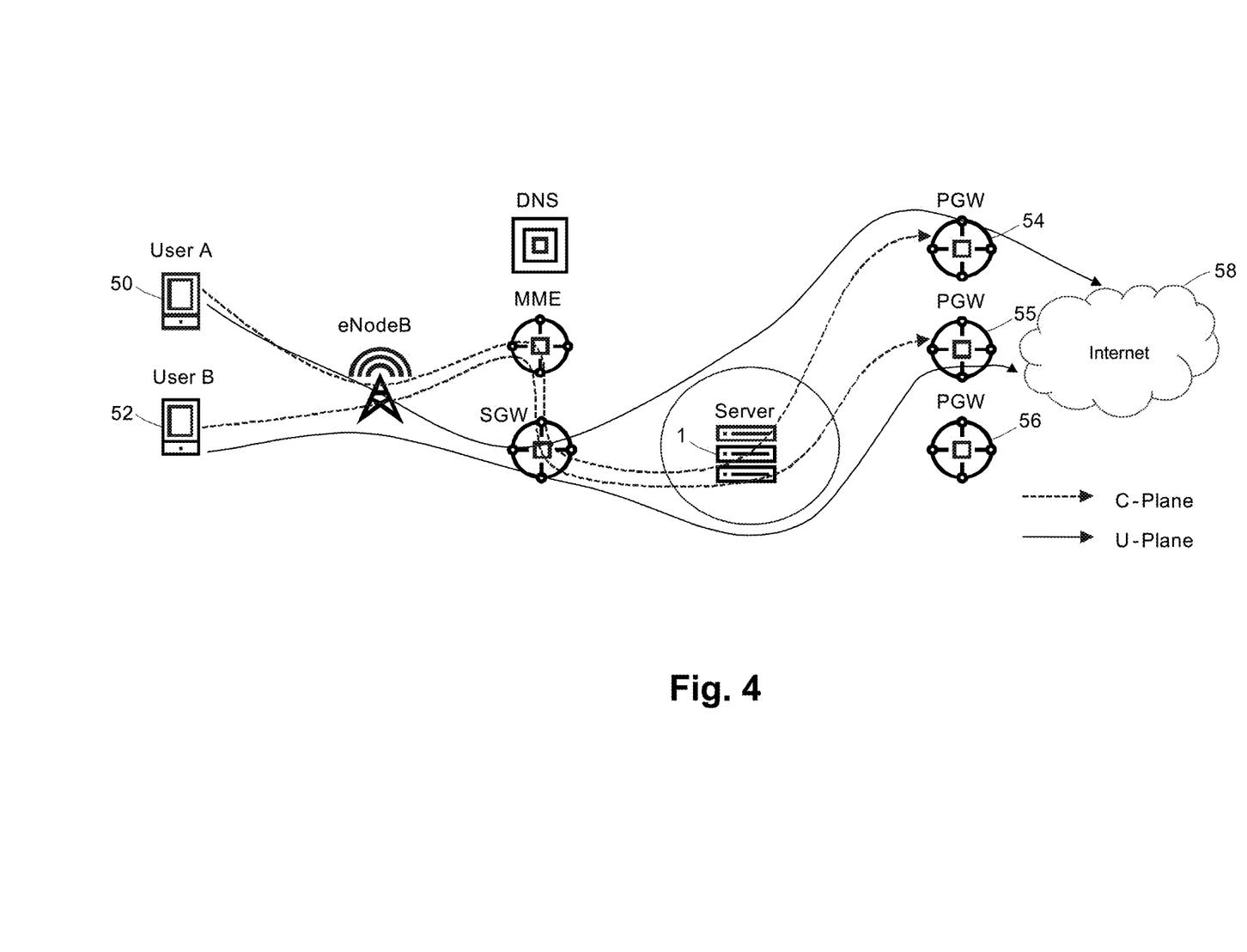
FIG. 4 shows an example state in which U-Plane signals from different user terminals are connected to the Internet through different PGWs through a server installed with a gateway selecting module according to one embodiment of the present disclosure.

For example, a database may be provided to define a relationship between IMSIs and IP addresses of PGWs, and the selector module 24 may use the IMSI derived from a Create Session Request as a terminal information element for selecting a PGW. As shown in the example illustrated in FIG. 4, this may enable the respective U-Planes of the terminals 50 and 52 of users A and B to go through separate gateways, such as PGW 54 and PGW 55 selected from PGWs 54-56, and connect to an external network such as the Internet 58, without going thought the server 1.

The use of the gateway control device or the server 1 in accordance with the present disclosure enables to select a PGW according to a desired relationship between information elements contained in a session establishing request and the PGW. The PGW can thus be selected flexibly, and the operator of the server 1 may provide a desired network service for each wireless terminal.

In another embodiment of the present disclosure, the gateway control device may be provided in the C-Plane pathway between the MME 6 and the SGW 8 in the exemplary LTE network shown in FIG. 1, and the selection of the SGW 8 may be made on the basis of a Create Session Request received from the MME 6.

Figure 5:
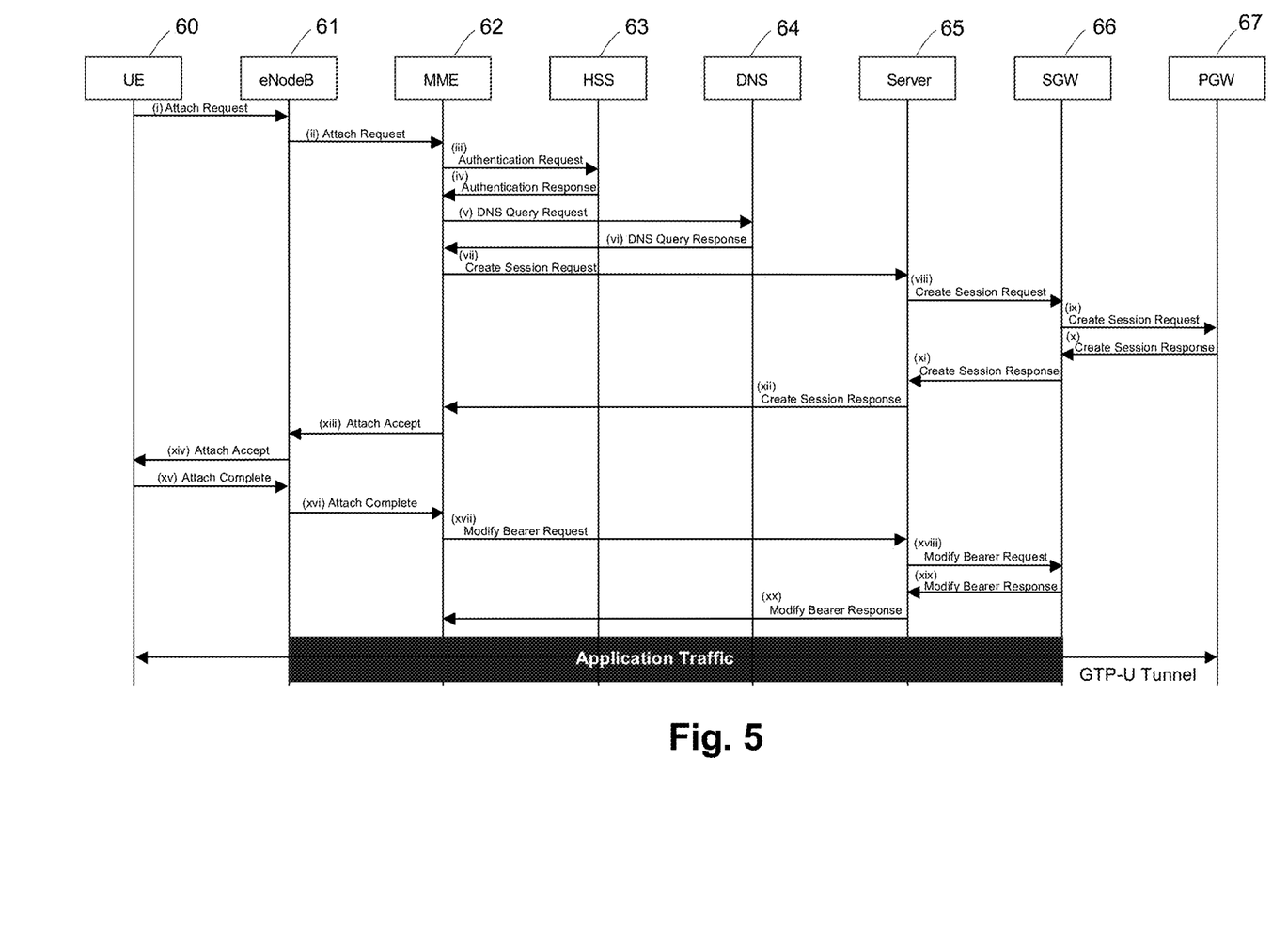
FIG. 5 explains an example sequence of messages for establishing a General Packet Radio Service (GPRS) Tunneling Protocol (GTP) for User Plane (GTP-U) session, in accordance with one embodiment of the present disclosure.

In regard to such embodiment, FIG. 5 explains an example flow of GTP messages that may take place for establishing a GPRS Tunneling Protocol for User Plane (GTP-U) session between an eNodeB 61 and an SGW 66 in response to an Attach Request from a wireless terminal UE 60, with the use of a server 65 according to one embodiment of the present disclosure.

The Attach Request to the eNodeB 61 (see (i) in FIG. 5) may be forwarded to an MME 62 (see (ii) in FIG. 5), and the MME 62 may communicate with an HHS 63 to authenticate the wireless terminal UE 60 (see (iii) and (iv) in FIG. 5). The MME 62 may acquire the domain name of the server 65 by querying a DNS 64 with the TA of the wireless terminal UE 60, and acquire a corresponding IP address of the server 65 by querying the DNS 64 with the domain name (see (v) and (vi) in FIG. 5).

The MME 62 may set the acquired IP address of the server 65 in the destination IP address of IP packets for carrying a Create Session Request (see (vii) in FIG. 5). The server 65 may receive the Create Session Request, derive one or more information elements associated with the wireless terminal UE 60, such as IMSI, select the IP address of the SGW 66 and set it in IP packets for carrying the Create Session Request (see (viii) in FIG. 5).

The SGW 66 may receive the Create Session Request, communicate with a PGW 67 and return a Create Session Response to the server 65 (see (ix), (x) and (xi) in FIG. 5). The Create Session Response may be returned to the MME 62 (see (xii) in FIG. 5) to establish a GPRS Tunneling Protocol for Control Plane (GTP-C) session between the MME 62 and the SGW 66. An Attach Accept may be sent from the MME 62 to the wireless terminal UE 60 through the eNodeB 61 (see (xiii) and (xiv) in FIG. 5), and an Attach Complete may be transferred from the wireless terminal UE 60 to the MME 62 through the eNodeB 61 (see (xv) and (xvi) in FIG. 5).

The MME 62 may send a Modify Bearer Request to the SGW 66 through the server 65 for communicating the IP address of the eNodeB 61 in the U-Plane to the SGW 66 (see (xvii) and (xviii) in FIG. 5). The SGW 66 may return a Modify Bearer Response to the MME 62 through the server 65 (see (xix) and (xx) in FIG. 5) to establish a GTP-U session between the eNodeB 61 and the SGW 66.

In the configuration described in connection with FIG. 5, the method described above for selecting a PGW may equally be applied for selecting a SGW. For example, the SGW 66 may be selected in accordance with a predetermined relationship associated with terminal information elements of UE 60 or a predetermined logic.

A counterpart SGW may also be selected in accordance with a predetermined relationship determined for each of categories prepared from information on subscribers of wireless terminals. Further, databases or tables such as a database defining a relationship between terminal information elements or categories and address information of SGW may be provided internally and/or externally of the server or the gateway control device, such that the gateway selector module 24 may access the database for selecting a counterpart SGW.

Application Examples

Examples of several use cases of the server installed with the gateway selecting module in accordance with the present disclosure will now be described.

Use Case 1—Switching to New PGW

In one example, a PGW to be connected to may be determined in response to an APN associated with a wireless terminal. As such, for switching an existing PGW in service to a new PGW, new APNs may be issued and set.

The use of a server 70 installed with a gateway control device according to one embodiment of the present disclosure enables a desired switching from a servicing PGW 72 to a new PGW 74, as shown in one example of FIG. 6.

The server 70 may use an IMSI as a terminal information element for selecting the new PGW 74. The server 70 may select the IP address of the PGW 72 in service ("old PGW") as the IP address of the destination PGW if the IMSI in a received Create Session Request is not associated with a testing terminal. The server 70 may select the IP address of the PGW 74 ("new PGW") if the IMSI in the received Create Session Request is the IMSI associated with the testing terminal.

With this configuration, only the traffic from the testing terminal can be connected to the external network through the PGW 74. The server 70 may be installed with a database defining a relationship between IMSIs and IP addresses of PGWs, and may select a PGW corresponding to an IMSI with reference to the database.

Figure 6A:
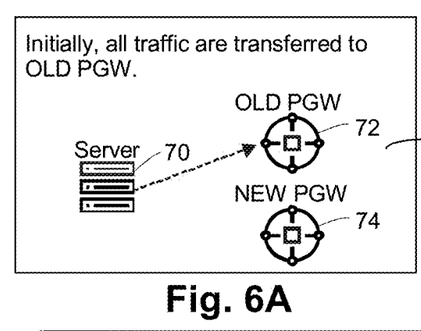
FIG. 6A to FIG. 6F each shows an example procedure for switching between an existing PGW and a new PGW using a server installed with a gateway selecting module according to one embodiment of the present disclosure.

In FIG. 6A, no testing terminal is being used. The IMSI in a Create Session Request received by the server 70 may be the IMSI of a general wireless terminal. The server 70 may thus select the IP address of the old PGW 72, and all traffics may be connected to the external network through the old PGW 72.

Figure 6B:
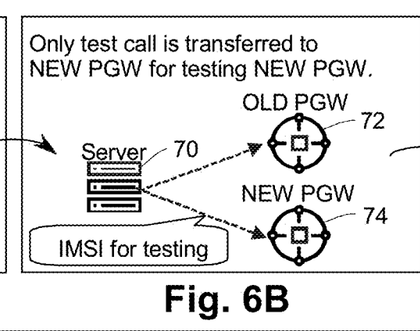

In FIG. 6B, calling may be made from a testing terminal for testing the new PGW 74. A Create Session Request may contain the IMSI of the testing terminal, and the server 70 may select the IP address of the new PGW 74. In this case, only the traffic from the testing terminal can be transferred to the new PGW 74, thereby enabling to test the new PGW without affecting the operation of the old PGW.

Figure 6C:
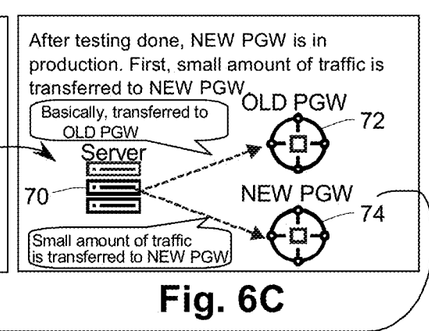

In FIG. 6C, the testing has been completed for the new PGW 74, and the use of the testing terminal may be aborted. The server 70 may select the IP address of the new PGW 74 for a limited number of IMSIs so that only the traffics from wireless terminals associated with those limited number of IMSIs may be transferred to the new PGW 74. Traffics from the other wireless terminals are still transferred to the old PGW 72.

Figure 6D:
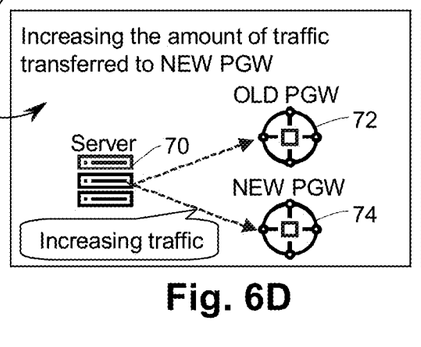

In FIG. 6D, the server 70 may select the IP address of the new PGW 74 for an increased number of IMSIs so that traffics from further wireless terminals are transferred to the new PGW 74.

Figure 6E:
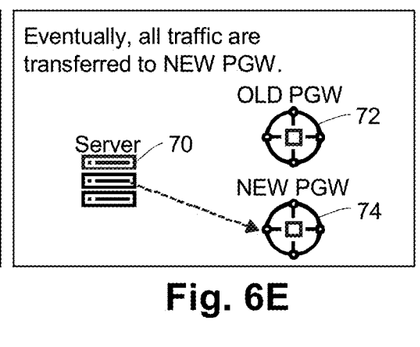

In FIG. 6E, the server 70 may be operated to select the IP address of the new PGW 74 for all IMSIs so that all of traffics from the associated wireless terminals are transferred to the new PGW 74.

Figure 6F:
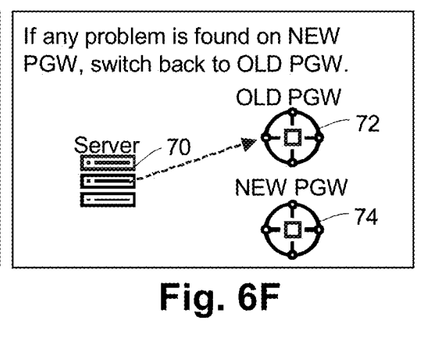

In FIG. 6F, all traffics from the wireless terminals are now routed to the new PGW 74, but the server 70 may still select the IP address of the old PGW for any of the IMSIs so that traffics from any wireless terminals may be transferred to the old PGW 74. This enables to address a problem found in the new PGW 74 during operation.

The switching between the old PGW to the new PGW shown in FIGS. 6A-6F may be attained by editing the aforementioned database. For example, the database may be edited so that IMSIs associated with the IP address of the old PGW 72 are made to associate with the IP address of the new PGW 74, or vice versa, and the server 70 may be made to refer to the edited database. It is also possible to specify for each IMSI whether traffics from wireless terminals should be transferred to the old PGW 72 or the new PGW 74, while checking in detail the status of operation of the new PGW 74.

Use Case 2—Providing PGW for each Application

The server installed with the gateway control device in accordance with the present disclosure enables to select a PGW for each user category, which may be created as desired. It may therefore be feasible in one embodiment to provide a PGW for each user category, and to connect a traffic from a wireless terminal of a user belonging to one category to the network through a PGW that is different from PGWs pertaining to wireless terminals of users belonging to other categories.

For example, communications from wireless terminals of medical or government institutions may be routed through a dedicated, high-quality (e.g., high fault-tolerant) PGW, so that communications with a higher priority are delivered to the destination without failure. Likewise, a corporate-dedicated PGW may be provided for exclusively routing traffics from wireless terminals of a particular corporate entity. It may also be feasible to route traffics from machines, such as sensors, through an Internet of Things (IoT) dedicated PGW, which is different from PGWs used for routing traffics from wireless terminals of users.

Use Case 3—Prevention of Fraudulent Use of Terminal

A fraudulent use of a stolen terminal 80, such as a mobile telephone, may be prevented by installing a server 82 with an ID determination module, as described with reference to FIG. 7.

Figure 7:
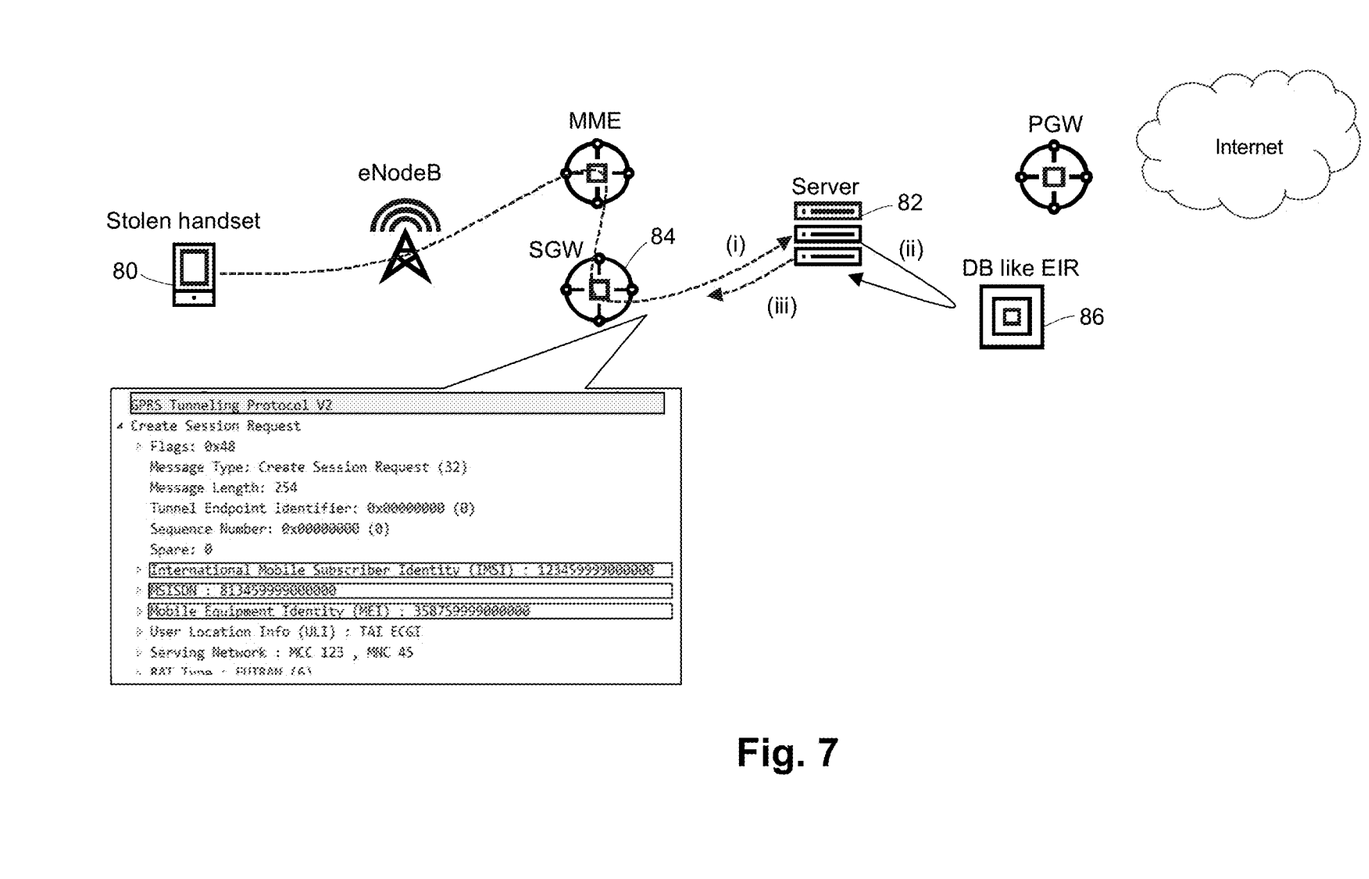
FIG. 7 shows an example procedure for preventing fraudulent use of a mobile telephone using a server installed with a gateway selecting module according to one embodiment of the present disclosure.

The server 82 may receive a Create Session Request initiated by an attachment request from the stolen wireless terminal 80 and transmitted from an SGW 84 (see (i) in FIG. 7). IMEI, IMSI and/or MSISDN may be derived from the Request.

The ID determination module may access an external database 86 (see (ii) in FIG. 7), such as an Equipment Identity Register (EIR) in which IMEIs of stolen terminals and communication-authenticated IMSIs or MSISDNs are registered.

In response to the ID determination module determining that the IMEI derived from the terminal matches the IMEI of the stolen wireless terminal or the extracted IMSI or MSISDN is not authentic, the server 82 may inhibit the transmission of IP packets carrying the received Create Session Request to any PGW, and return an error message (see (iii) in FIG. 7). The ID determination module may be included in the storage of the server 82.

As such, the server 82 blocks external network access from the stolen wireless terminal 80. PGWs are not involved in the process and wasteful consumption of PGW resources due to fraudulent accesses is eliminated.

Use Case 4—Service Chaining

Wireless communication service operators may provide such services as Hypertext Transfer Protocol (HTTP) proxy, parental control and firewall in a Gigabit Local Area Network (Gi-LAN). A PGW may perform service chaining by separating service chain routes from each other, with the use of a function called Virtual APN. Otherwise, APNs associated with terminals are changed in order to provide different services to different users.

Figure 8:
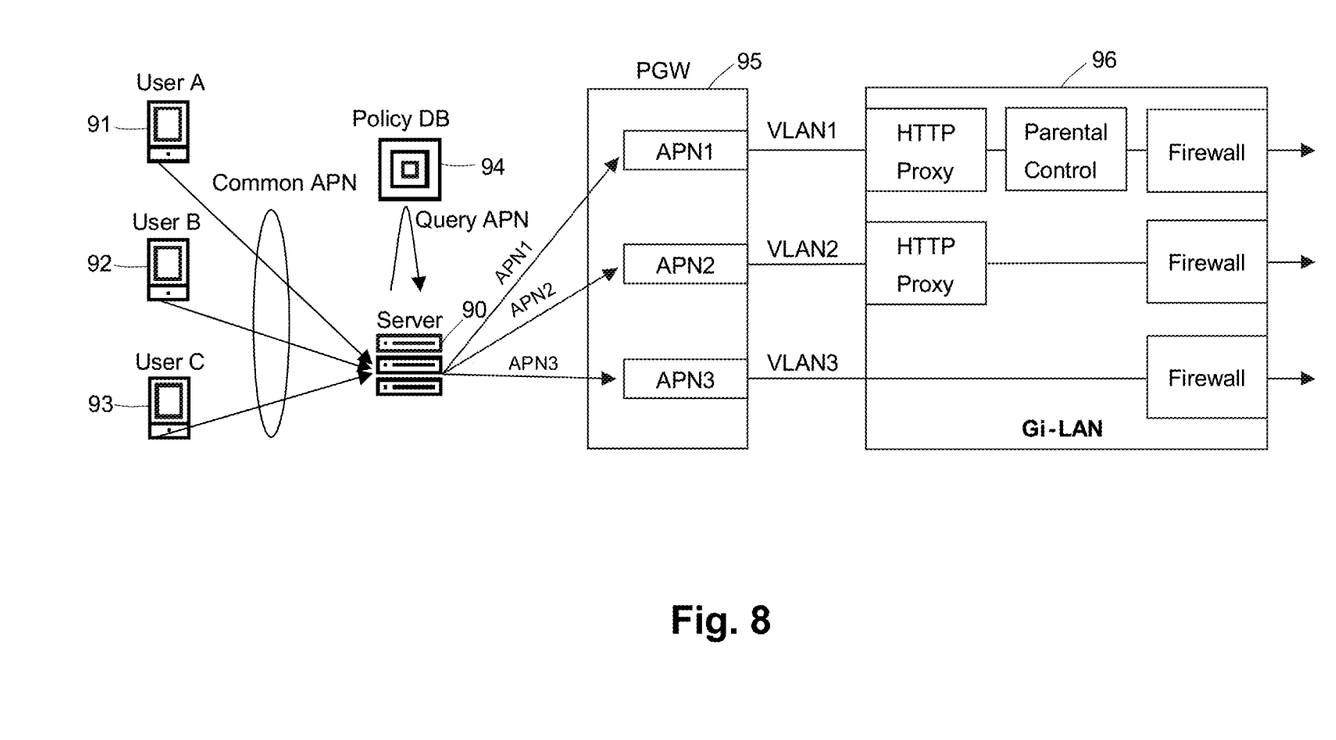
FIG. 8 is an example conceptual diagram explaining service chaining which can be implemented using a server installed with a gateway selecting module according to one embodiment of the present disclosure.

The use of a server 90 installed with a gateway control device in accordance with one embodiment of the present disclosure enables to provide different network services to different users A, B and C as shown in FIG. 8, even if terminals 91-93 of the users are associated with the same APN. This may be accomplished by providing, internally and/or externally of the server 90, a database such as a policy database 94 defining a relationship between IMSIs of wireless terminals and identification information elements pertaining to services subscribed by users assigned with the IMSIs, and by rewriting APN with a editor module of the server 90.

The editor module may rewrite an APN included in a Create Session Request received by the server 90 in accordance with a service subscribed by the user of the wireless terminal. For example, the server 90 may access the database using, as a key, a user ID such as the IMSI derived from the Create Session Request, so as to acquire the identification information of a service associated with the user ID. The editor module may rewrite the APN to an APN corresponding to the the acquired identification information, such as APN1, APN2 or APN3 used by a PGW 95 selected by the server 90 for separating service routes from each other in a Gi-LAN 96.

In response to the PGW 95 receiving from the server 90 the edited Create Session Request, the PGW 95 may separate network routes according to the new APN, and this enables to provide a different service for each different user.

Use Case 5—Local Breakout

Figure 9:
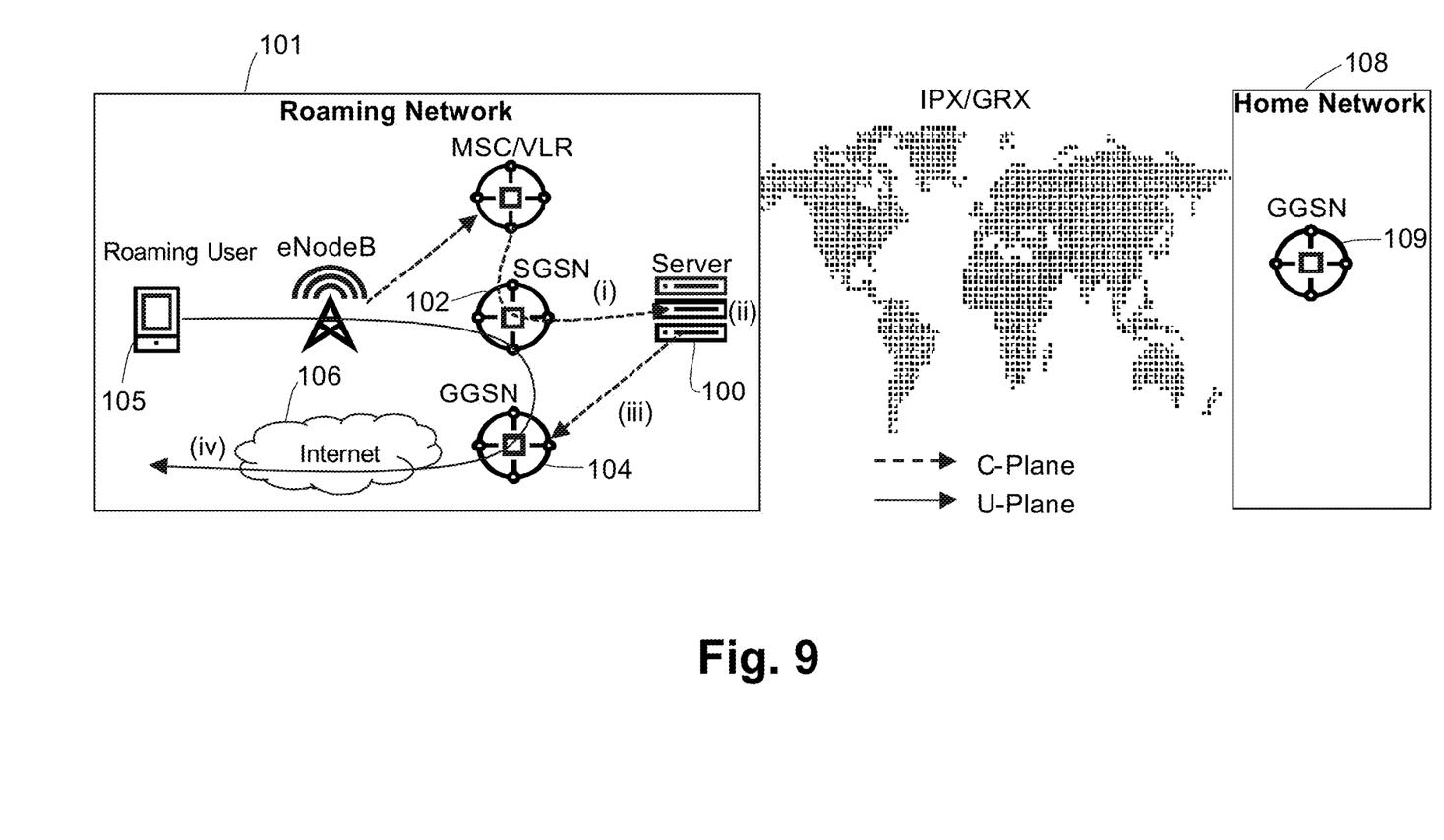
FIG. 9 shows an example procedure for implementing a local breakout during international roaming using a server installed with a gateway selecting module according to one embodiment of the present disclosure.

FIG. 9 shows an example procedure for implementing a so-called local breakout using a server 100 installed with a gateway control device according to one embodiment of the present disclosure for accessing an external network by international roaming.

The server 100 may be located in a roaming network 101 for receiving GTP messages from a Serving GPRS Support Node (SGSN) 102 located in the roaming network 101, in place of a Gateway GPRS Support Node (GGSN) 109 located in a home network 108.

A mobile telephone 105 of a roaming user located in the roaming network 101, such as a network of AT&T, may make an international roaming access to the home network 108, such as a network of NTT Docomo, through a relaying operator such as Internet Protocol Exchange (IPX) or GPRS Roaming Exchange (GRX). A Create Session Request from the SGSN 102 in the roaming network 101 may be transmitted to the server 100 (see (i) in FIG. 9). The server 100 may detect that the access is a roaming access made from the roaming network 101, and may rewrite with an editor the destination IP address of the Create Session Request so that the access is directed to a GGSN 104 in the roaming network 101, rather than the GGSN 109 in the home network 108 (see (ii) in FIG. 9).

The server 100 may transmit the edited Create Session Request to the GGSN 104 in the roaming network 101 (see (iii) in FIG. 9). In this manner, GTP sessions in the U-Plane is established between the SGSN 102 and the GGSN 104 in the roaming network, without going through the server 100. As a result, U-Plane signals to the Internet are directly transferred from the roaming network to the Internet, without going through the relaying operator (see (iv) in FIG. 9).

Use Case 6—GTP Message Manipulation

A server according to one embodiment of the present disclosure may be configured to interpret a GTP message received from an SGW or PGW, and edit the GTP message by adding, deleting or rewriting information elements. An editor module of the server may edit a GTP message for transmission to a desired SGW or PGW.

For example, in the case of communication between an SGW and a PGW for international roaming, a communication error could occur due to a difference in interpretation of protocols between the roaming network and the home network.

In such a case, the editor may edit a GTP message received by the server to be consistent with the interpretation in the other network. The edited GTP message may be transmitted to the counterpart PGW or SGW by the server, so that the communication between the roaming network and the home network can be maintained normally.

Use Case 7—Multi-Access Edge Computing

Figure 10:
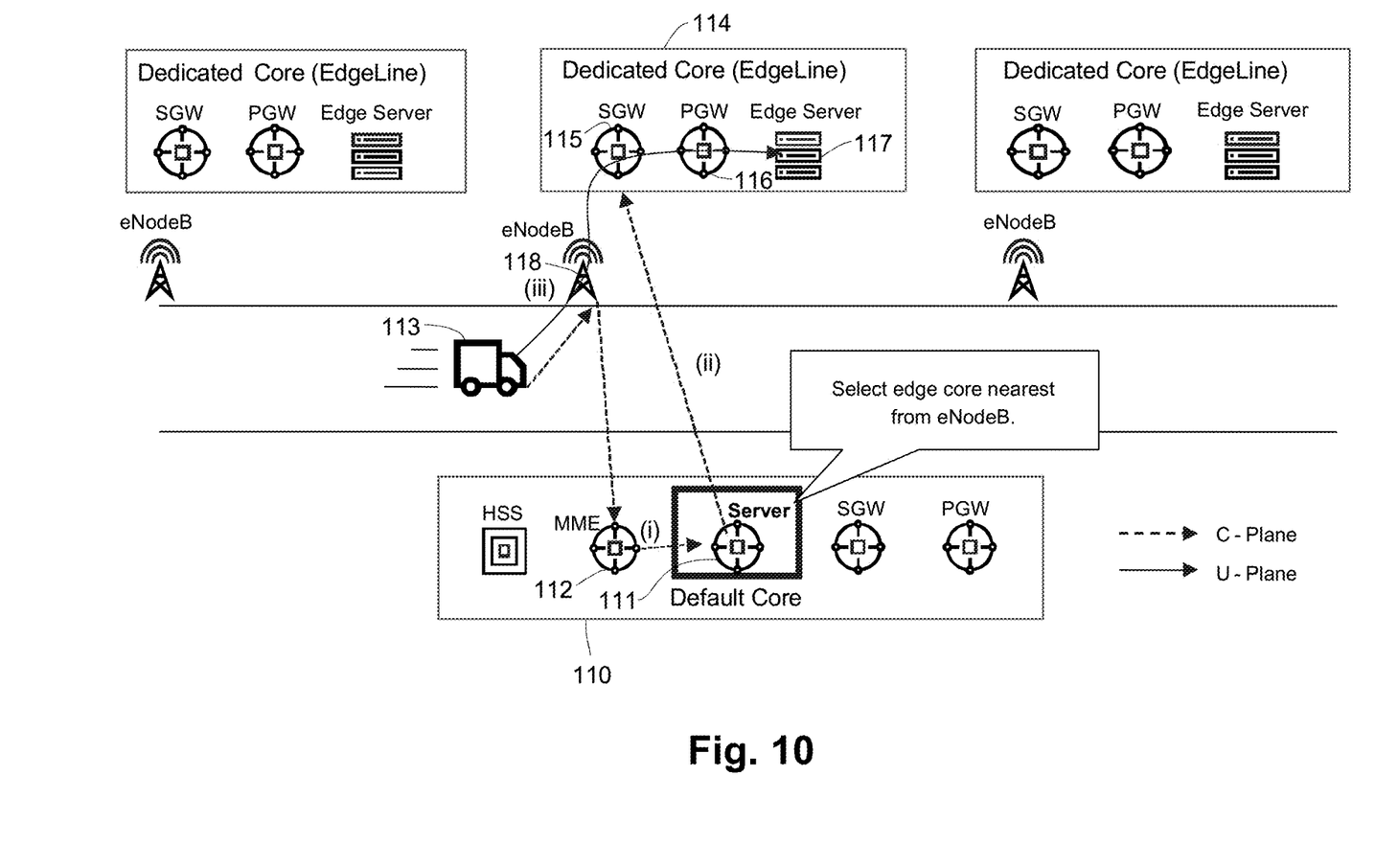
FIG. 10 shows an example procedure for implementing multi-access edge computing using a server installed with a gateway selecting module according to one embodiment of the present disclosure.

FIG. 10 shows an exemplary procedure for implementing multi-access edge computing using a server 111 installed with a gateway control device according to one embodiment of the present disclosure.

In this use example, the server 111 may directly receive a Create Session Request transmitted from an MME 112 in response to an attachment request from mobile device, such as a wireless terminal carried on a car 113 (see (i) in FIG. 10). The server may transfer, based on an IMSI or User Location Information (ULI) contained in the received Create Session Request, the Create Session Request to an SGW 115 in a dedicated core network 114, i.e., an edge line, in the vicinity of an eNodeB 118 connected to the wireless terminal (see (ii) in FIG. 10).

In this manner, U-Plane signals from the eNodeB 118 are transmitted to the SGW 115 in the core network, without going through a default core (see (iii) in FIG. 10). The wireless terminal can thus access an edge server 117 in the dedicated core network 114 via the PGW 116, and can communicate with predetermined applications in the edge server 117. The mobile device is not limited to the wireless terminal carried on the car, and may include any other wireless mobile devices.

Use Case 8—Network Slicing

In 3GPP, a core network may be separated into network slices on the basis of a terminal identifier called UE Usage Type.

In this use example, an MME in a dedicated network may be designated by an MME in a default core in response to the UE Usage Type of a wireless terminal, and a server may receive C-Plane signals from the designated MME instead of a PGW of a communication service provider such as an MVNO.

The server may select a PGW for each of categories which may be created as desired. Desired categories may be created in advance, for example by collecting and analyzing data stored in an external or internal database of the server, such as observation records from a Call Detail Record (CDR), customer or service data maintained by a communication carrier, and an Operation Support System (OSS). The server may operate to select a PGW in a dedicated core network corresponding to a desired category as a destination for connecting the U-Plane. The category may be a category isolated or sliced on the basis of age group, gender or detailed profile of users, as well as the type of wireless terminals. The use of the server may thus enable network slicing based on other categories than UE Usage Type.

The method and apparatus of the present disclosure have been described for use in the 4G LTE network environment, but it will be understood that the present disclosure may equally be applicable to the 3G network and the 5G network environment. For example, the Serving GPRS Support Node (SGSN), Gateway GPRS Support Node (GGSN) and Home Location Resister (HLR) in the 3G and/or 5G network environment may correspond to the SGW, PGW and HSS, and Create PDP Context Request and Create PDP Context Response messages in the 3G and/or 5G network environment may correspond to the aforementioned Create Session Request and Create Session Response messages.

What is claimed is:

1. A method comprising:
   receiving an Internet Protocol (IP) packet carrying a session establishing request from a first device, wherein the first device is a Mobility Management Entity (MME);
   based on information corresponding to a wireless terminal included in the session establishing request, selecting an address to one of multiple second devices, wherein the one of multiple second devices comprises a new packet data network gateway (PGW);
   generating a packet to carry the session establishing request;
   editing the session establishing request, and setting the selected address to the new PGW as a destination address of the packet;
   transmitting the packet to the new PGW;
   establishing, based on the transmitted packet, a session between the wireless terminal and the new PGW and testing operation of the new PGW with packet data traffic from the wireless terminal;
   upon successful testing of the new PGW, determining additional packet data traffic from a limited number of additional wireless terminals to transfer to the new PGW, and transferring the additional packet data traffic to the new PGW; and
   iteratively increasing an amount of packet data traffic allowed to be transferred to the new PGW from other additional wireless terminals.

2. The method of claim 1 wherein the new PGW is connected to a packet data network.

3. The method of claim 1 comprising:
   in response to a query made with a predetermined Access Point Name (APN), configuring a Domain Name System (DNS) to return a domain name of a gateway control device; and
   setting an IP address of the gateway control device based on the destination address of the IP packet received from the first device.

4. The method of claim 1 wherein the wireless terminal is a mobile terminal and wherein the information corresponding to the wireless terminal includes at least one of the following: a Mobile Subscriber ISDN Number (MSISDN), an International Mobile Subscriber Identity (IMSI), or an International Mobile Equipment Identity (IMEI) of the mobile terminal.

5. The method of claim 1,
   wherein selecting the address to one of multiple second devices comprises selecting the address from a database that defines a relationship between the information corresponding to the wireless terminal and the multiple second devices.

6. The method of claim 1 comprising:
   selecting a category from a database that defines a relationship of the category and the information corresponding to the wireless terminal within the session establishing request; and
   selecting, from another database that defines a relationship between the category and the multiple second devices, the address to one of the multiple second devices.

7. The method of claim 1 comprising:
   wherein the session establishing request comprises a General Packet Radio Service (GPRS) Tunneling Protocol (GTP) message.

8. The method of claim 1, further comprising rewriting an Access Point Name (APN) associated with identification information corresponding to the wireless terminal based on a service to which a user of the wireless terminal is subscribed to enable service chaining by the new PGW.

9. The method of claim 1, further comprising:
   determining whether the wireless terminal comprises a testing terminal;
   upon a determination that the wireless terminal comprises a testing terminal, testing the new PGW, and transferring to the new PGW, packet data traffic from only the testing terminal until the testing of the new PGW is completed.

10. A non-transitory machine-readable storage medium encoded with instructions executable by a processor, that when executed causes a computing device to:
    receive an Internet Protocol (IP) packet carrying a session establishing request from a first device, wherein the first device is a Mobility Management Entity (MME);
    based on information corresponding to a wireless terminal included in the session establishing request, select an address to one of multiple second devices, wherein the one of multiple second devices comprises a new packet data network gateway (PGW);
    generate a packet to carry the session establishing request;
    edit the session establishing request, and set the selected address to the new PGW as a destination address of the packet;

transmit the packet to the new PGW;
establish, based on the transmitted packet, a session between the wireless terminal and the new PGW and testing operation of the new PGW with packet data traffic from the wireless terminal;
upon successful testing of the new PGW, determine additional packet data traffic from a limited number of additional wireless terminals to transfer to the new PGW, and transferring the additional packet data traffic to the new PGW; and
iteratively increase an amount of packet data traffic allowed to be transferred to the new PGW from other additional wireless terminals.

11. The non-transitory machine-readable storage medium of claim 10 wherein the wireless terminal is a mobile terminal and wherein the information corresponding to the wireless terminal includes at least one of the following: a Mobile Subscriber ISDN Number (MSISDN), an International Mobile Subscriber Identity (IMSI), or an International Mobile Equipment Identity (IMEI) of the mobile equipment.

12. The non-transitory machine-readable storage medium of claim 10, comprising instructions executable by the processor, that when executed causes the computing device to:
select the address of the second device with reference to a database that defines a relationship between the information corresponding to the wireless terminal included in the session establishing request and addresses of the multiple second devices.

13. The non-transitory machine-readable storage medium of claim 10 comprising instructions executable by the processor, that when executed causes the computing device to:
specify a category from a database that defines a relationship of the category and the information corresponding to the wireless terminal included in the session establishing request; and
select, from another database that defines a relationship between the category and the multiple second devices, the address to one of the multiple second devices.

14. The non-transitory machine-readable storage medium of claim 10, comprising instructions executable by the processor, that when executed causes the computing device to edit the session establishing request, wherein the session establishing request comprises a General Packet Radio Service (GPRS) Tunneling Protocol (GTP) message.

15. A server comprising:
a receiver that receives an Internet Protocol IP packet from a first device, wherein the first device is a Mobility Management Entity (MME), the IP packet carrying a session establishing request and including an address of the apparatus as the destination address;
a selector that edits the session establishing request, and selects, based on information corresponding to a wireless terminal included in the session establishing request, an address of one of multiple second devices, wherein the one of multiple second devices comprises a new packet data network gateway (PGW);
a transmitter that generates and transmits a packet to carry the session establishing request to the new PGW;
wherein the selector further establishes, based on the transmitted packet, a session between the wireless terminal and the new PGW and tests operation of the new PGW with packet data traffic from the wireless terminal, and upon successful testing of the new PGW, determines additional packet data traffic from a limited number of additional wireless terminals to transfer to the new PGW;
the transmitter further transferring the additional packet data traffic to the new PGW; and
wherein the selector further iteratively increases an amount of packet traffic allowed to be transferred to the new PGW from other additional wireless terminals.

16. The server of claim 15 wherein the new PGW is connected to a packet data network.

17. The server of claim 15 wherein the wireless terminal is a mobile terminal and wherein the information corresponding to the wireless terminal includes at least one of the following: a Mobile Subscriber ISDN Number (MSISDN), an International Mobile Subscriber Identity (IMSI), or an International Mobile Equipment Identity (IMEI) of the mobile terminal.

18. The server of claim 15 comprising an internal and/or external database that defines a relationship between the information corresponding to the wireless terminal and addresses of the multiple second devices, and
wherein the gateway selector refers to the database and selects the address of the second device.

19. The server of claim 15 comprising, internally and/or externally:
a database that defines a relationship between a category and the information corresponding to the wireless terminal; and
another database that defines a relationship between the category and the multiple second devices,
wherein the gateway selector refers to the databases to specify the category and the address of the second device corresponding to the category.

20. The server of claim 15, comprising an editor that edits the session establishment request, wherein the session establishment request comprises a GTP message.

* * * * *